(12) United States Patent
Carson

(10) Patent No.: US 6,361,024 B1
(45) Date of Patent: Mar. 26, 2002

(54) HAND-HELD ULTRASONIC FOG GENERATOR

(75) Inventor: Jerry D. Carson, Beaverton, OR (US)

(73) Assignee: PWC Technologies, Inc., Beaverton, OR (US)

( * ) Notice: Subject to any disclaimer, the term of this patent is extended or adjusted under 35 U.S.C. 154(b) by 0 days.

(21) Appl. No.: 09/527,418

(22) Filed: Mar. 17, 2000

Related U.S. Application Data

(60) Provisional application No. 60/124,911, filed on Mar. 17, 1999, now abandoned.

(51) Int. Cl.⁷ .................................................. B01F 3/04
(52) U.S. Cl. ...................... 261/30; 261/81; 261/DIG. 48
(58) Field of Search ........................... 261/30, 72.1, 81, 261/DIG. 48

(56) References Cited

U.S. PATENT DOCUMENTS

| | | | | |
|---|---|---|---|---|
| 3,387,607 A | * | 6/1968 | Gauthier et al. | 261/DIG. 48 |
| 3,469,785 A | * | 9/1969 | Boucher et al. | 261/DIG. 48 |
| 3,490,697 A | * | 1/1970 | Best, Jr. | 261/DIG. 48 |
| 3,901,443 A | * | 8/1975 | Mitsui et al. | 261/DIG. 48 |
| 4,113,809 A | * | 9/1978 | Abair et al. | 261/81 |
| 4,238,425 A | * | 12/1980 | Matsuoka et al. | 261/81 |
| 4,479,609 A | * | 10/1984 | Maeda et al. | 261/81 |
| 4,719,057 A | * | 1/1988 | Mizoguchi | 261/81 |
| 4,771,608 A | | 9/1988 | Liu et al. | 62/50 |
| 4,875,340 A | | 10/1989 | Liu et al. | 62/50.2 |
| 4,882,096 A | * | 11/1989 | Rueben | 261/DIG. 48 |
| 5,010,905 A | * | 4/1991 | Snyder et al. | 261/DIG. 48 |
| 5,300,260 A | * | 4/1994 | Keshet et al. | 261/81 |
| 5,464,572 A | * | 11/1995 | Bonzi | 261/DIG. 48 |

FOREIGN PATENT DOCUMENTS

| | | | | |
|---|---|---|---|---|
| FR | 2677437 A | * | 12/1992 | 261/DIG. 48 |
| JP | 56-100247 A | * | 8/1981 | 261/DIG. 48 |
| JP | 63-263336 A | * | 10/1988 | 261/DIG. 48 |
| JP | 4-103934 A | * | 4/1992 | 261/DIG. 48 |
| JP | 4-187922 A | * | 7/1992 | 261/DIG. 48 |

* cited by examiner

Primary Examiner—C. Scott Bushey
(74) Attorney, Agent, or Firm—Marger Johnson & McCollom, P.C.

(57) ABSTRACT

Provided is a hand-held, portable, battery operated, reliable, and inexpensive, ultrasonic, visible vapor generator or fog generator for use in contamination sensitive areas, such as clean rooms. The ultrasonic fog generator is useful for visualizing laminar airflow between rooms, around equipment, around ventilation systems, and the like. The ultrasonic fog generator includes a housing and a battery pack sized to be carried by a user. The fog generator of the present invention, therefore, is capable of being easily moved around a room and does not take up valuable floor space in the clean room.

21 Claims, 8 Drawing Sheets

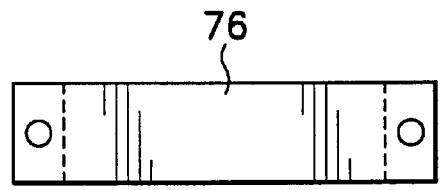
FIG.8A
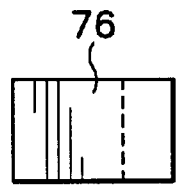
FIG.8B
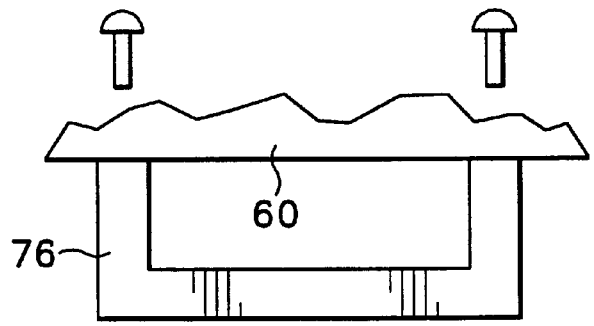
FIG.8C
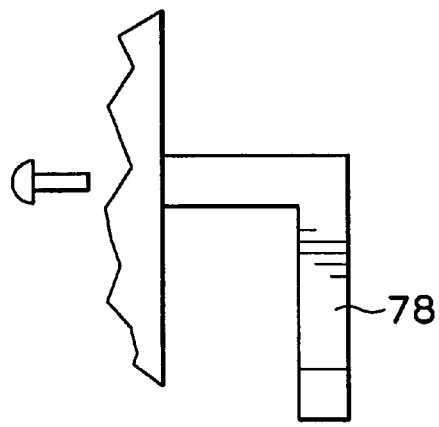 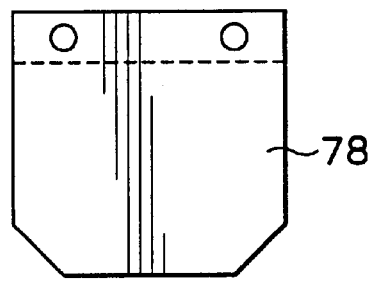
FIG.9A  FIG.9B

HAND-HELD ULTRASONIC FOG GENERATOR

This application claims priority from U.S. Provisional Pat. Appln. Ser. No. 60/124,911, filed Mar. 17, 1999, now abandoned.

BACKGROUND OF THE INVENTION

1. Field of the Invention

The present invention relates generally to equipment for visualizing airflow and, more particularly, to a hand-held ultrasonic fog generator for visualizing laminar airflow in contamination sensitive areas such as clean rooms.

2. Description of the Prior Art

Integrated circuit chips (ICs) are manufactured in hyper clean environments termed clean rooms. Even the smallest of particulates in a clean room can contaminate the wafer under process by introducing, e.g., short circuits that result in a failed IC and a consequent lower yield. Ventilation or air ducts and other such equipment are notorious particulate carriers. For this reason, it is critical to control the airflow in clean rooms. Fog generators are used in clean rooms to visualize laminar airflow emanating from ventilation and air ducts or other such equipment.

There are generally four types of visual vapor or fog generators on the market today. Carbon dioxide ($CO_2$) fog generators generate a visual fog using a solid block of $CO_2$—dry ice—dropped into a super heated—140 deg F or higher—bath of deionized (DI) water. $CO_2$ fog generators require an alternating current (AC) power source to heat the DI bath. Once the DI bath is heated, however, the $CO_2$ fog generator can be disconnected from its AC power source. One disadvantage of the $CO_2$ fog generator is that the fog quantity it produces is unregulated. That is, the fog quantity cannot be tuned to the particular application because the fog it produces is largely based on the size of the block of dry ice. As the dry ice melts, the quantity of fog output from the fog generator diminishes. Another disadvantage is that $CO_2$ fog generators must be reconnected to its AC power source after each use to reheat the DI water bath. Yet another disadvantage is that $CO_2$ fog generators are large taking up valuable floor space in the clean room. $CO_2$ fog generators are also unwieldy being difficult to move around the clean room.

Helium (He) bubble generators, as the name implies, generate small He filled bubbles of water that float in the air at almost neutral buoyancy. The primary disadvantage with He bubble generators is that they only produce a small quantity of bubbles that do not easily visualize laminar airflow.

Ultrasonic fog generators create a fog by vibrating a bath of DI water using ultrasonic sound. Ultrasonic fog generators use an AC power source. One disadvantage of ultrasonic fog generators is that the unit must be kept stationary to operate properly because if the fog generator is tipped from a horizontal position, the transducers are exposed causing them to burnout and fail prematurely.

The ultrasonic fog generator disburses the water vapor through a long hose. The long hose causes the DI water vapor fog to condense on the inside and drip out the end of the hose creating a possible safety hazard by dripping on the clean room floor. If the ultrasonic fog generator is used over a chemical bath, the hose drippings may additionally contaminate the bath or wafer being fabricated therein. Much like the $CO_2$ fog generators, ultrasonic fog generators are large and unwieldy.

DI fog generators generate a fog by using steam from boiling DI water. The DI water is heated until boiling produces water bubbles. The bubbles are passed through a bath of liquid nitrogen ($N_2$) creating a super cooled fog that visualizes airflow. An example of a DI fog generator is described in U.S. Pat. Nos. 4,771,608 and 4,875,340 to Liu et al., incorporated herein by reference. As shown in both the above-mentioned Liu patents, DI fog generators are unusually large. DI fog generators are either fixedly installed or wheeled to the site. Another disadvantage of DI fog generators is that they require an AC power source and liquid $N_2$. DI fog generators are very expensive to own and operate. DI fog generators are the most hazardous of all the above-listed fog generators because they require both a boiler to heat the DI water and extremely cold liquid $N_2$ to operate.

Accordingly, a need remains for an ultrasonic fog generator that is hand-held, portable, battery operated, reliable, and inexpensive to own and operate.

SUMMARY OF THE INVENTION

An object of the present invention is to overcome the disadvantages associated with prior art fog generators for visualizing airflow in clean rooms.

Another object of the present invention is to provide a hand-held and portable ultrasonic fog generator.

Yet another object of the present invention is to provide an ultrasonic fog generator that is battery operated allowing for ease of movement.

Yet another object of the present invention is to provide an ultrasonic fog generator that allows the user to choose between a battery pack and a remote power source.

Yet another object of the present invention is to provide an ultrasonic fog generator that includes easily accessible trigger switches for turning the fog vapor on and off.

Yet another object of the present invention is to provide an ultrasonic fog generator that delivers fog without dripping condensation from a fog exit or barrel.

Yet another object of the present invention is to provide an ultrasonic fog generator that includes sensors to prevent the operation of transducers without a predetermined level of water covering the transducers thereby eliminating transducer burnout and failure.

Yet another object of the present invention is to provide an ultrasonic fog generator that includes circuitry to prevent battery over charging and discharging.

Yet another object of the present invention is to provide an ultrasonic fog generator that is reliable and inexpensive to own and operate.

BRIEF DESCRIPTION OF THE DRAWINGS

The foregoing and other objects, features, and advantages of the invention will become more readily apparent from the following detailed description of a preferred embodiment that proceeds with reference to the following drawings.

FIGS. 8A–C are a front, side, and top view of the holster loop included in the battery pack of the fog generator shown in FIG. 7.

FIGS. 9A–B are a side and front view of the clip included in the fog generator shown in FIG. 1.

DETAILED DESCRIPTION OF THE PREFERRED EMBODIMENT

Figure 7:
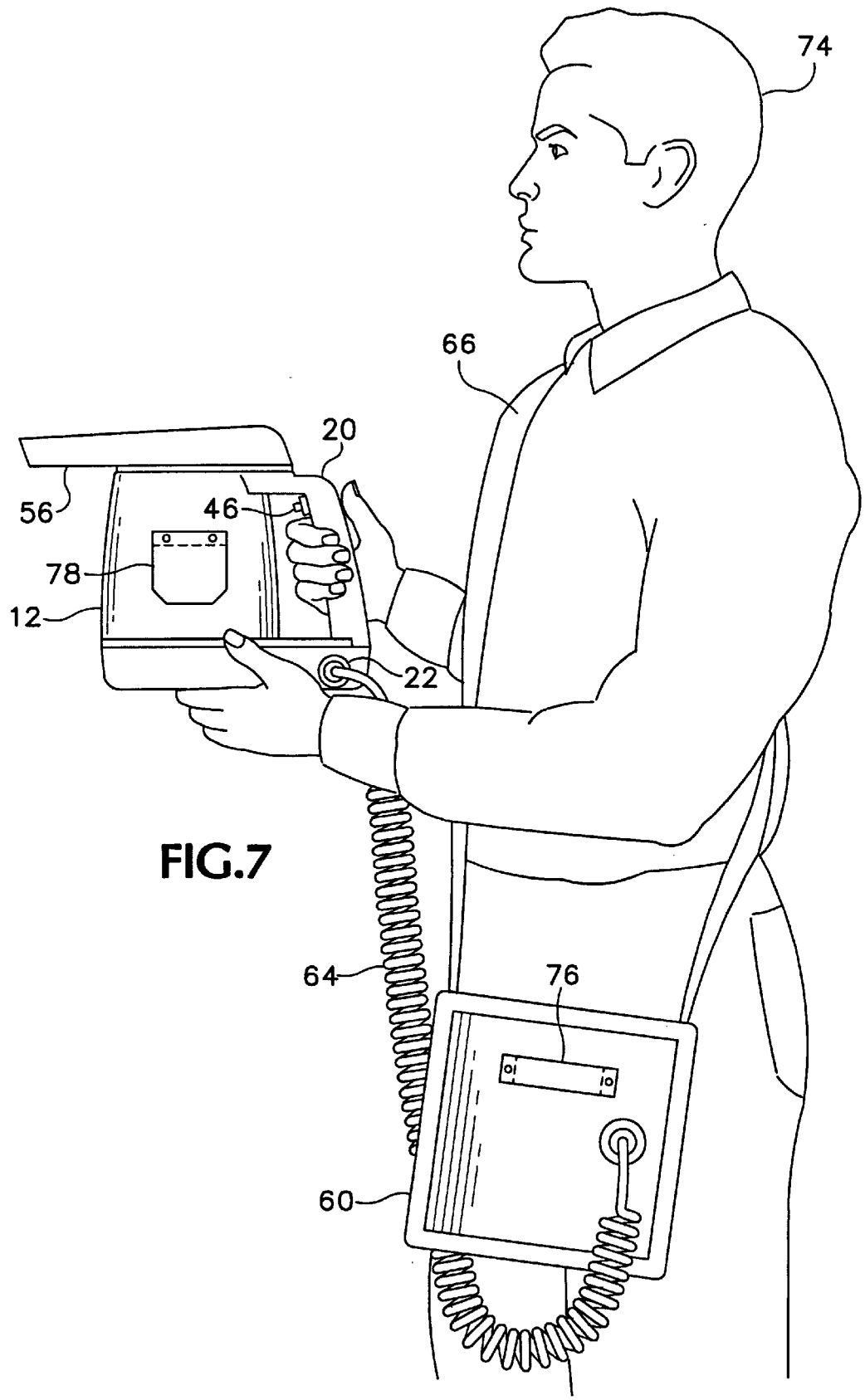
FIG. 7 is an illustration of a method of using the fog generator shown in FIG. 1.

The hand-held ultrasonic fog generator of the present invention is used to visualize laminar airflow in contamination sensitive areas such as clean rooms. Referring to FIGS. 1–4, the fog generator 10 includes a housing 12 sized to be carried by a user. A handle 20 protrudes from a side of the housing 12 to accommodate the user's handgrip (not shown) allowing the fog generator to be hand-held and portable. An on/off switch 46 is located at a top end of the handle 20. The on/off switch 46 is actuated by the user's finger as the user's hand grips the handle 20 (FIG. 7). The position of the on/off switch 46 allows the user to easily turn the fog generator on and off. The on/off switch 46 is, for example, push button S/ST switch, part number GCE-35-430STD manufactured by C&K Components, Inc. headquartered in Massachusetts. The housing 12 is preferably made of injection-molded plastic or the like.

The housing 12 includes a lower cavity 14 separated from an upper cavity 16 by a stiffener member 18. The lower cavity 14 is positioned at a lower end of the housing 12. The lower cavity 14 substantially encloses a fan 26 operated by a fan switch 28. The fan switch 28 is a common switch used to drive the fan 26 in one of two positions. A fan vent or opening 30 is positioned at a bottom end of the lower cavity 14. The fan vent 30 allows air to be sucked into and pressurize the interior of the housing 12. A user 74 sets the speed of the fan 26 by sliding the fan switch 28 in one of two positions. The fan is a readily available two-speed direct current (DC) fan, for example, 12 volt DC fan part number 273-243 manufactured by Radio Shack. The fan switch is also readily available two-position slide fan switch, for example, part number DTSP SW 10A manufactured by Radio Shack.

The housing 12 can rest on a plurality of feet 24 when not in use. The feet 24 are preferably made of a polymer such as rubber. A power inlet 22 is located on a bottom side of the housing 12 for receiving a removable power cord 64 (FIG. 7) that couples the battery pack 60 (FIG. 7) to the housing 12.

Figure 6:
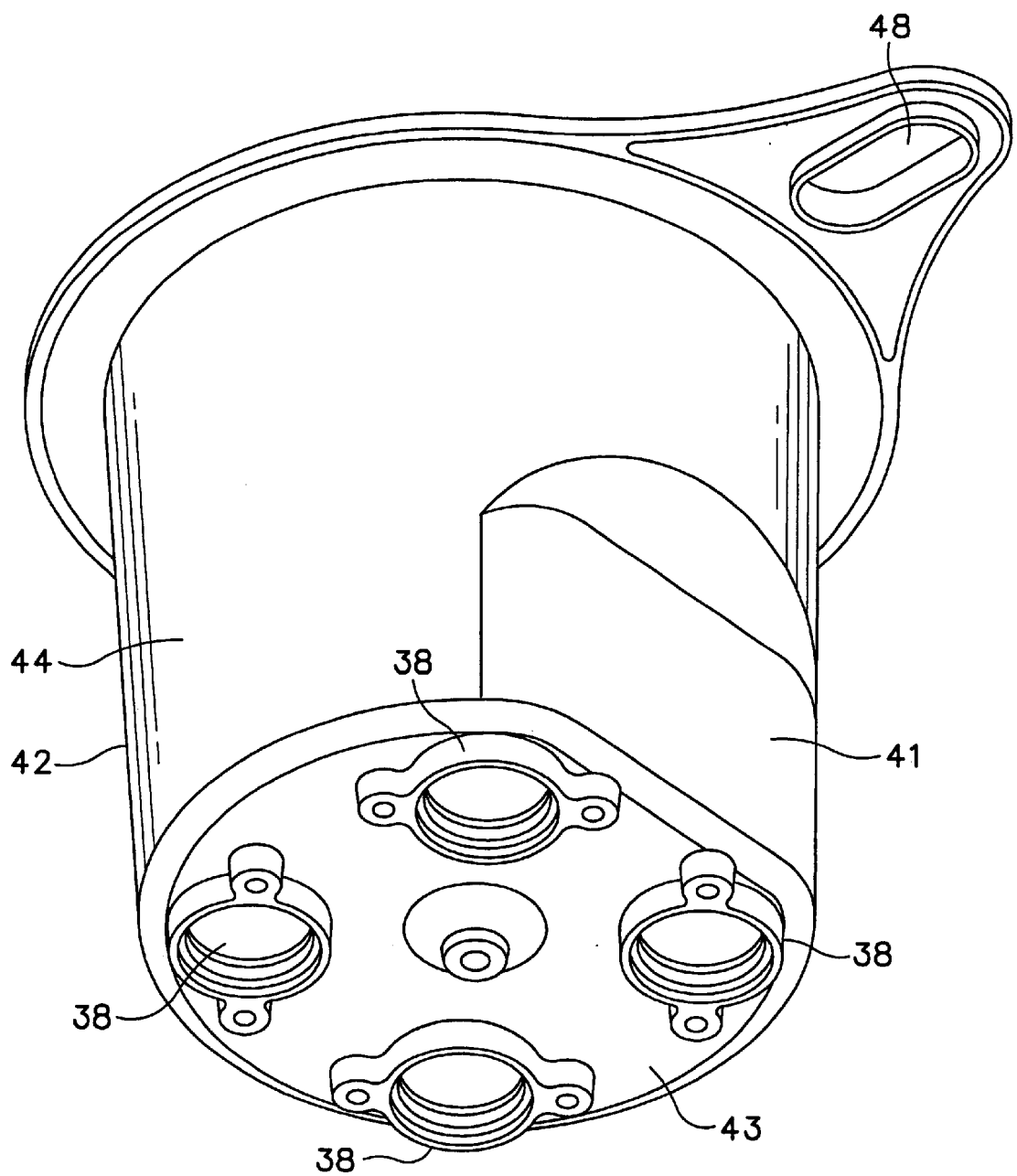
FIG. 6 is a perspective view of the water container of the fog generator shown in FIG. 1.

A stiffener member 18 separates the lower cavity 14 from the upper cavity 16. The stiffener member 18 includes a vent or opening 19 that channels air between the lower cavity 14 and the upper cavity 16. The upper cavity 16 substantially encloses a container or receptacle 42 for containing water as best shown in FIG. 6. The water in container 42 is not shown. The container 42 preferably contains DI water. The container 42 is substantially cylindrical having a bottom end 43 and sidewalls 44.

A level sensor 40 (FIGS. 1–4) is positioned on a sidewall 44 mounted on a level sensor mount 41. The level sensor 40 is wired through the on/off switch 46. When the level sensor 40 detects that the water level has reached a predetermined low level, the level sensor 40 causes the on/off power switch 46 to turn off the fog generator. More particularly, the level sensor 40 will turn off the power to the fog generator 10 when it detects that the water is low enough to expose the transducers 36. By doing so, the level sensor 40 prevents the transducers 36 from prematurely failing due to burnout. The level sensor 40 eliminates the requirement of having to keep the fog generator 10 level and stationary as is necessary with the prior art fog generators described previously. The level sensor 40 is, for example, part number PSF100A pressure sensor manufactured by World Magnetics, Inc.

Transducers 36 are mounted to a bottom end 44 of the container 42 on transducer mounts 38 as best shown in FIG. 6. In the preferred embodiment, four transducers 36 are mounted on four transducer mounts 38. The number and placement of the transducers 36, however, is not critical and can change to accommodate differently sized and shaped housings 12, among other considerations. The container 42 is preferably made of injection-molded plastic or the like. The transducer mounts 38 and the level sensor mount 41 are preferably molded into the container 42.

The fog generator 10 uses ultrasonic vibrations to generate the fog that is used to visualize laminar airflow in clean rooms. A transducer driver circuit 34 operates each of the transducers 36. The driver circuits 34 are printed circuit assemblies shown conceptually in block form in FIGS. 1–4. Where four transducers 36 are used—as shown in FIGS. 1–4—four driver circuits 34 are necessary. It is possible, however, to integrate the transducer driver circuits 34 such that a one to one relationship between transducers 36 and transducer driver circuits 34 is not required. The transducer driver circuits 34 generate all of the control signals necessary to drive the transducers 36. The transducer driver circuits 34 receive power from the battery pack 60 (FIG. 7) through the power inlet 22.

The transducers 36 include a crystal (not shown) that vibrates in response to the power received from the battery pack 60 through the driver circuits 34. The transducers 36 preferably vibrate at around 40,000 cycles per second. A metal plate (not shown) bonded to the crystal in the transducers 36 is submerged in the water contained in container 42. The ultra high frequency vibrations produced by the transducer 36 atomize or vaporize the water in container 42 producing a cool fog (not shown) at the surface of the water. The fog is forced out the container 42 by the air sucked into the interior of the fog generator 10 by the fan 26.

Figure 1:
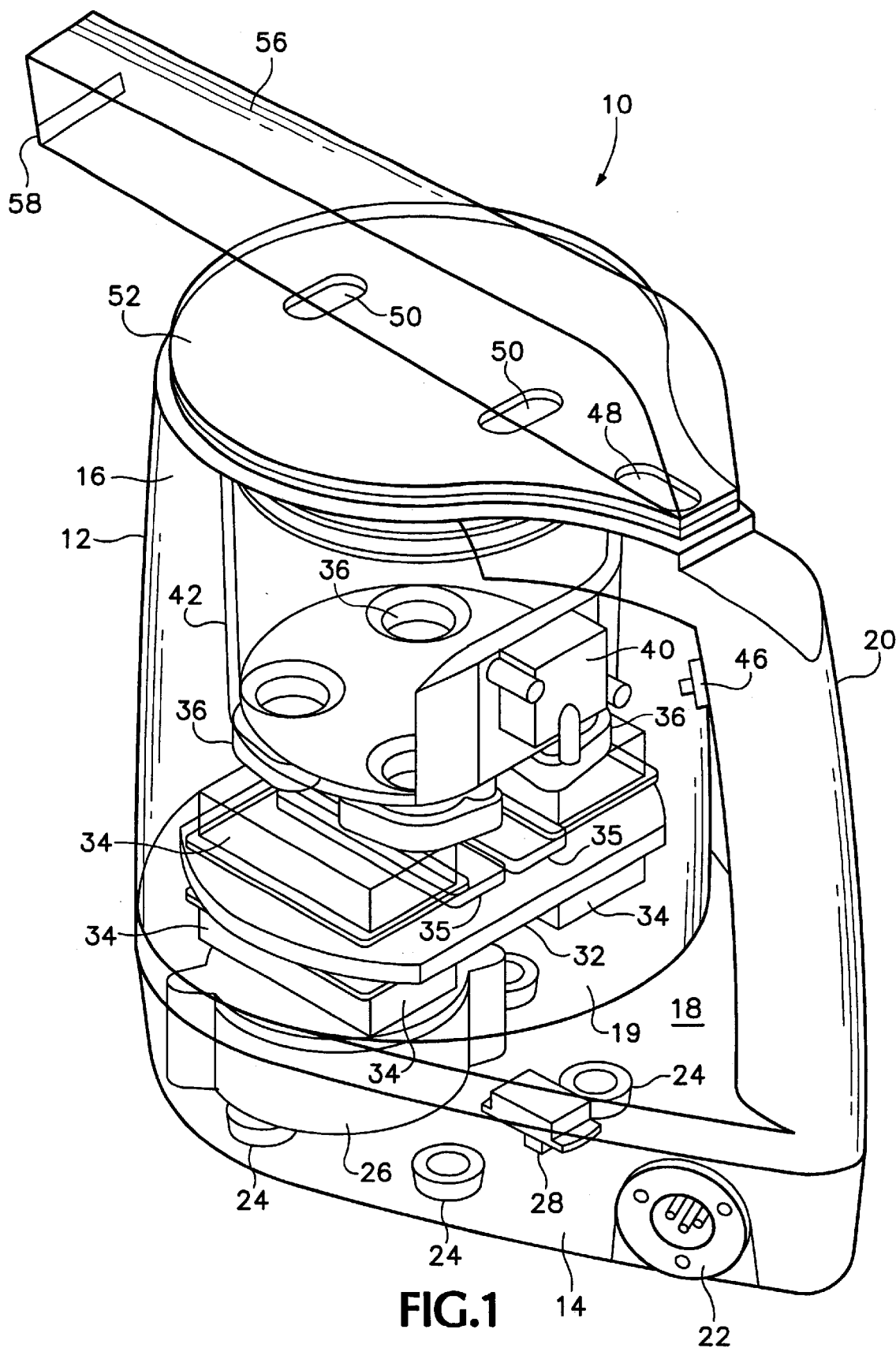
FIG. 1 is a perspective view of the fog generator of the present invention.

Each driver circuit 34 is mounted on a heatsink 32 through its driver circuit heatsink 35 as best shown in FIG. 1. Where four driver circuits 34 are used, two driver circuits 34 are mounted on a top side of the heatsink 32 while the remaining two driver circuits 34 are mounted on a bottom side of the heatsink 32 through their corresponding driver circuit heatsinks 35. The heatsink 32 is preferably made of extruded aluminum. The heatsink 32, in turn, is mounted either to the bottom end of the housing 12 or a bottom end 43 of the container 42. The air drawn from the vent 30 by the fan 26 cools the heatsink 32 and the driver circuit heatsinks 35.

The transducers 36 are, for example, part number HV0604 manufactured by Stolz of North America, Inc. The transducer driver circuits 34 are, for example, part number HV0610 also manufactured by Stolz of North America, Inc.

Figure 5:
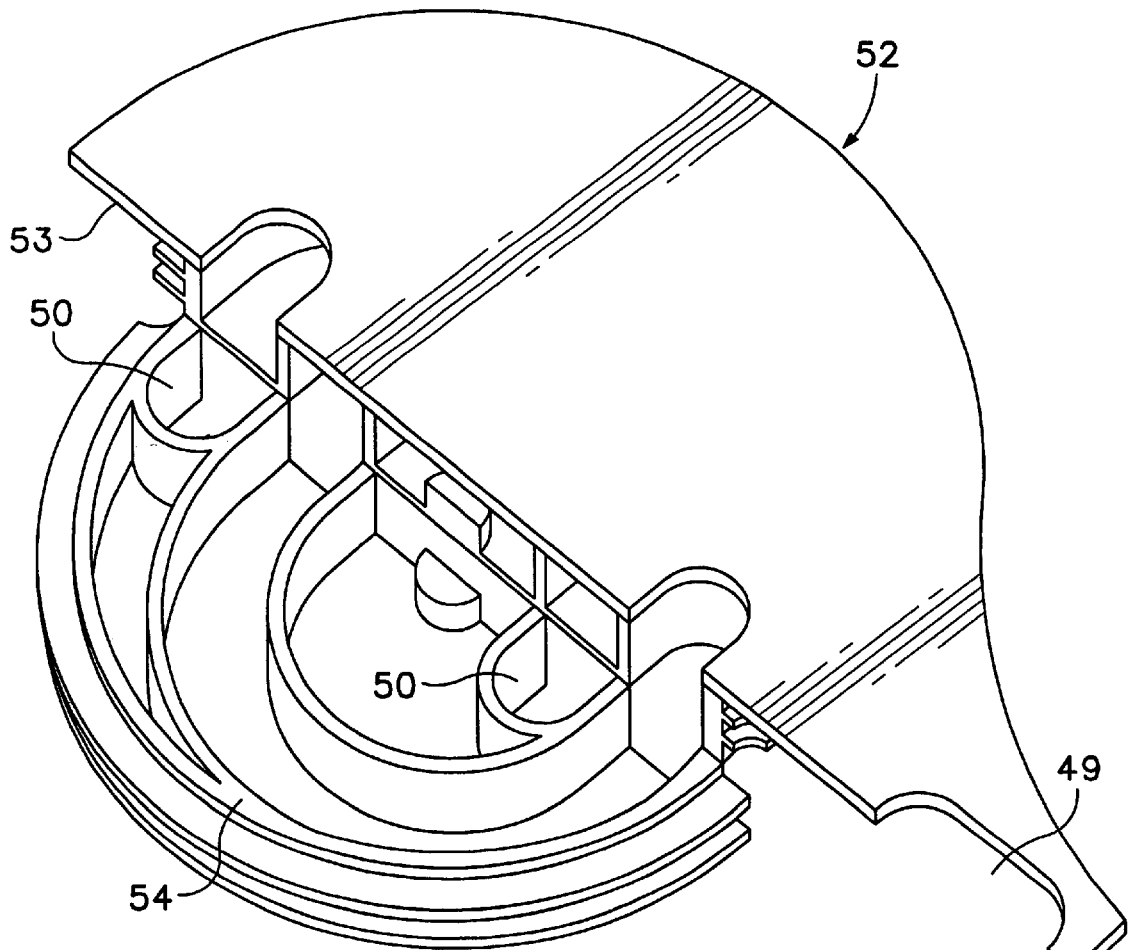
FIG. 5 is a perspective cutaway view of the lid of the fog generator shown in FIG. 1.

Referring to FIG. 5, a lid 52 caps the container 42. A lip 53 surrounds the perimeter of the lid 52. The lip 53 allows the lid 52 to rest on the top end 45 of the container 42. The lid includes openings 50 that allow fog generated inside of the container 42 to escape. The lid 52 includes a labyrinth seal 54 that prevents the water contained in container 42 from running out of the barrel 56 (FIGS. 1–3) or back into the container 42 when the fog generator 10 is not held in a horizontal position.

Figure 2:
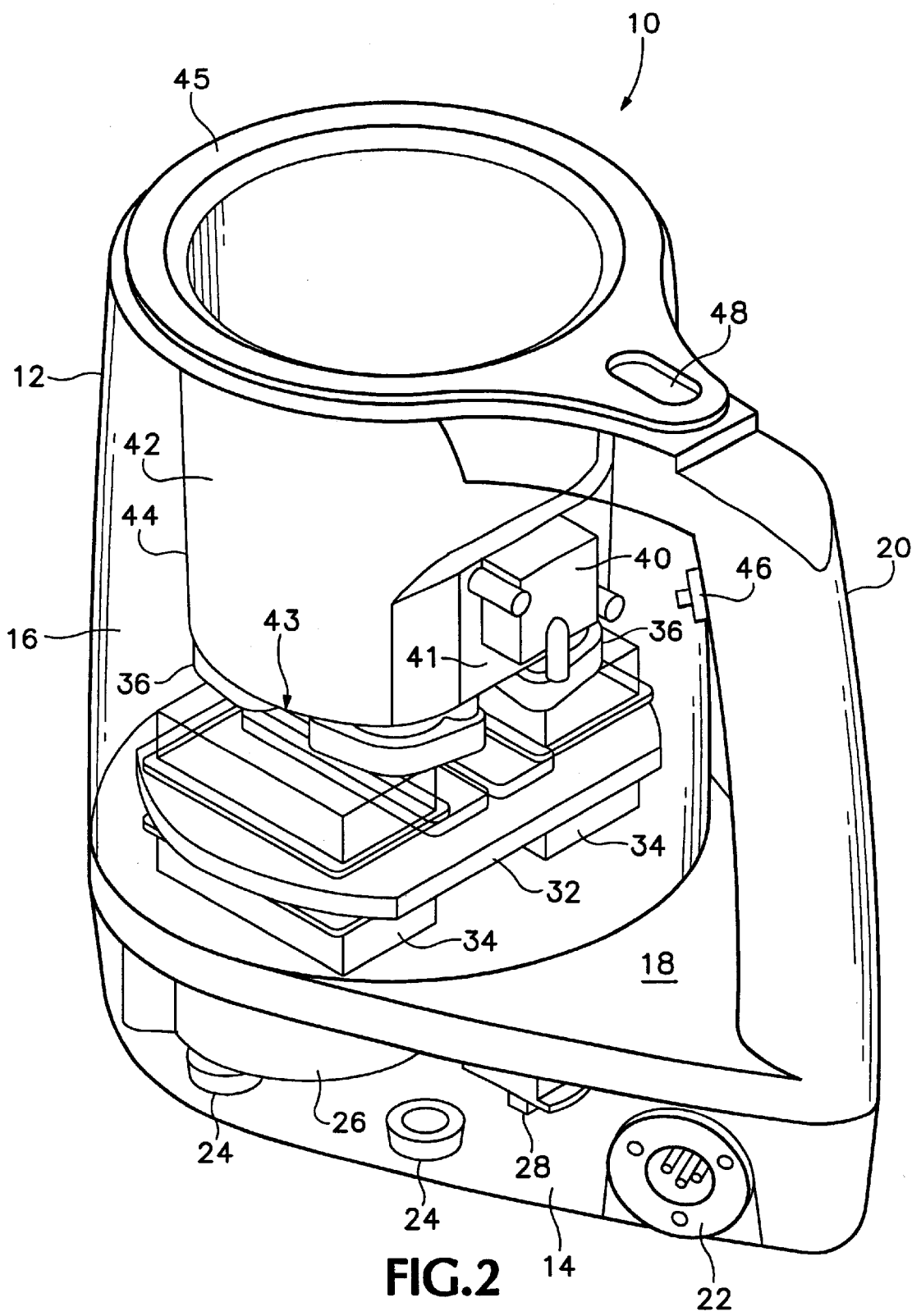
FIG. 2 is a perspective view of the fog generator shown in FIG. 1 without the barrel or the lid.
Figure 3:
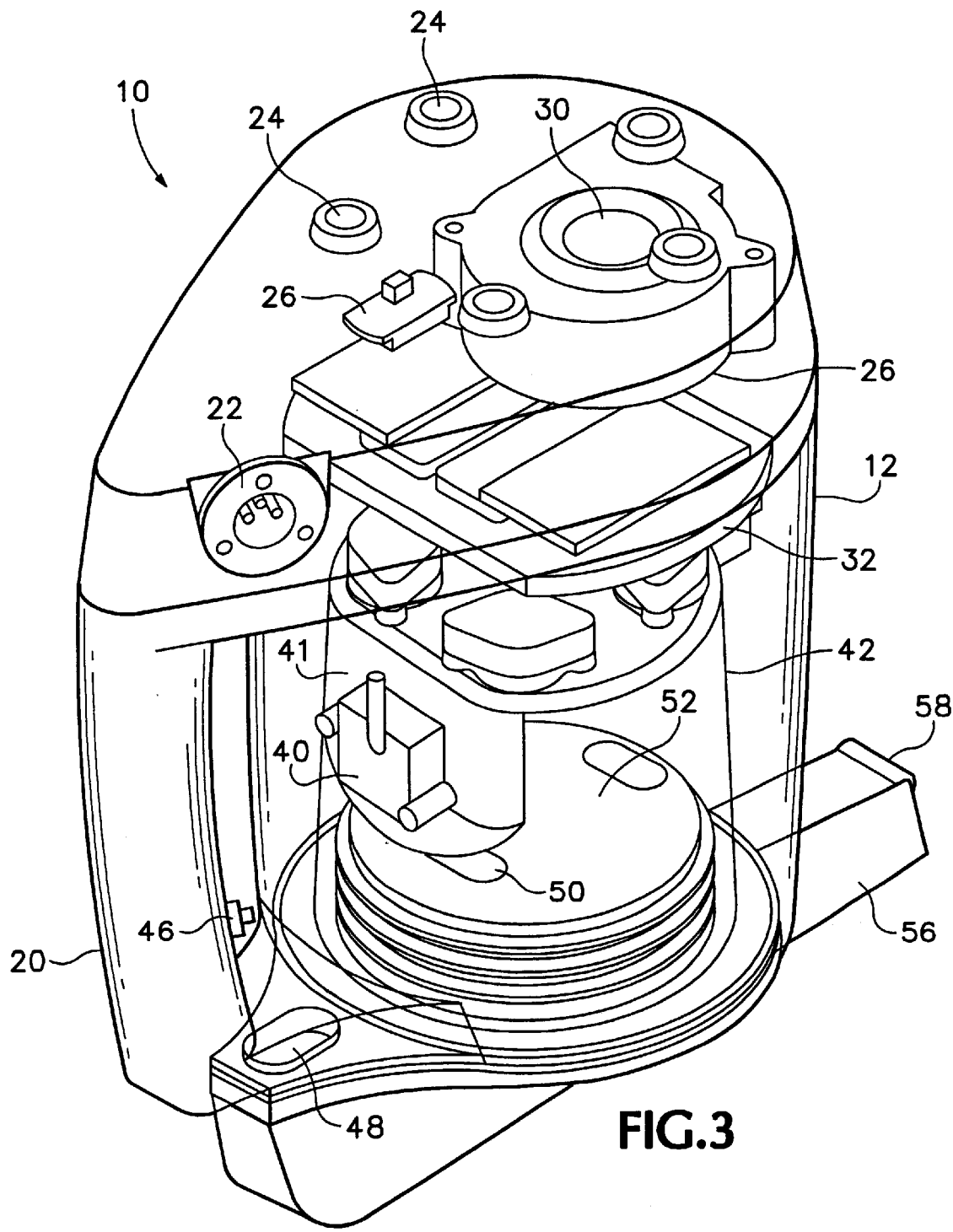
FIG. 3 is a perspective view of the bottom of fog generator shown in FIG. 1.
Figure 4:
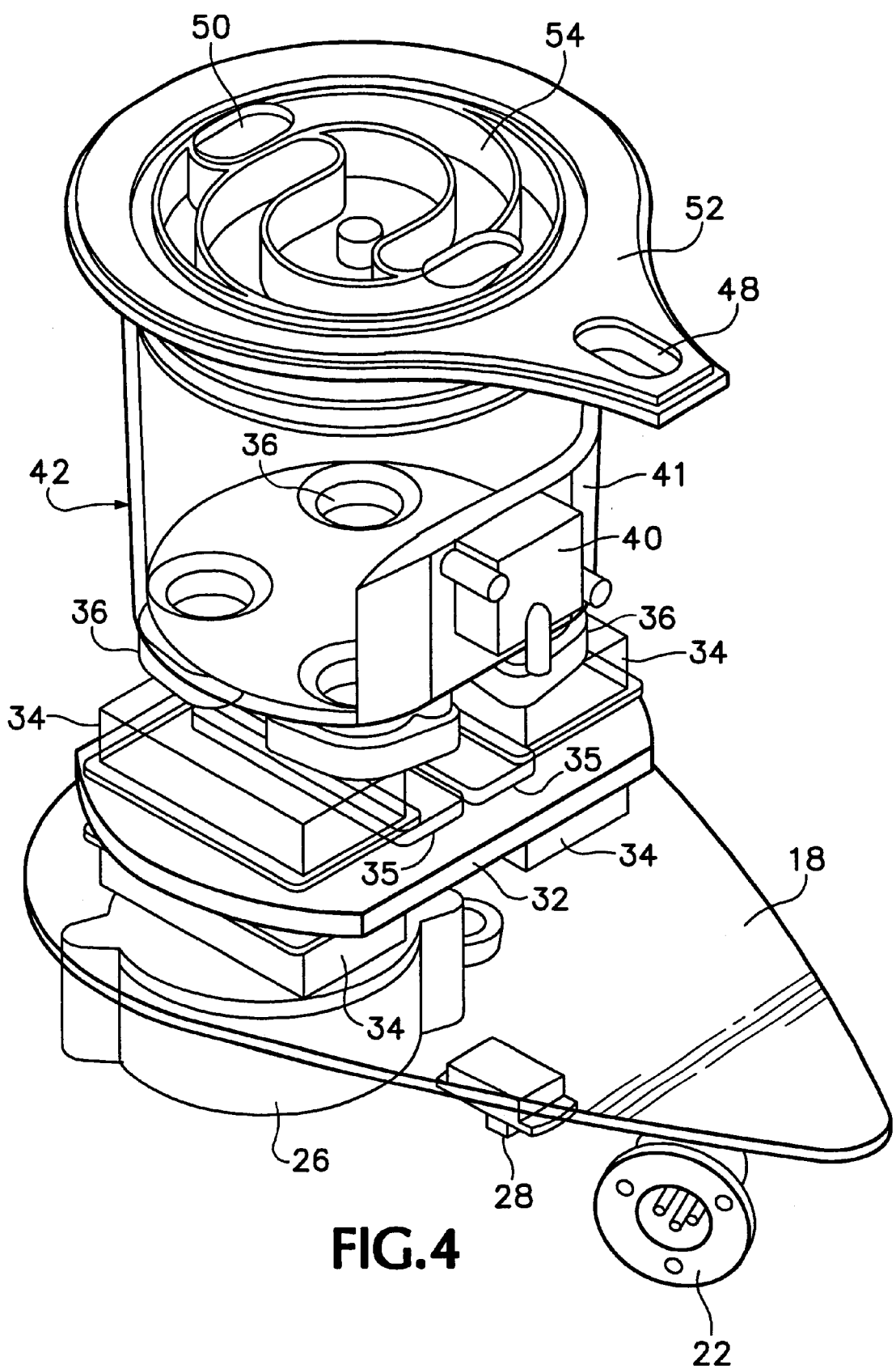
FIG. 4 is a perspective view of the internal components of the fog generator shown in FIG. 1.

Referring to FIGS. 1–3, the barrel 56 is positioned on the top end of the fog generator 10. The barrel 56 includes a condensate trap 58 to keep water condensed inside from dripping out the barrel 56. The condensate trap 58 is shaped as a lip on the end of the barrel 56. The condensate trap 58 eliminates safety hazards when the fog generator 10 is used over chemical baths or water sensitive equipment by preventing condensed water from dripping out of the barrel 56. The barrel 56 shown in FIGS. 1 and 3 has a substantially square cross section and is about 6 inches long. The barrel 56, however, can have a variety of shapes and sizes depending on the application.

Referring again to FIGS. 1–6, the container 42 includes an air vent or opening 48 in communication with a top end of the handle 20 and a lid opening 49 (FIG. 5). Air is initially sucked into the interior of the housing 12 by the fan 26 through the fan vent 30 as explained above. The air is then channeled from the lower cavity 14 to the upper cavity 16 and the handle 20 through the opening 19 on the stiffener member 18. The air pressurizes the interior of the housing 12 and escapes through the container opening 48 and the lid opening 49. The air then travels through the labyrinth seal 54 of the lid 52 down into the container 42 and mixes with the fog generated by the transducers 36 inside of the container 42. The fog/air combination then travels into the openings 48 and 49 down the barrel 56. Once the power switch is depressed to an on position, fog is generated out of the barrel 56 almost instantaneously.

Referring to FIG. 7, the fog generator includes a battery pack 60 connected to the fog generator 10 using a removable power cord 64. The removable power cord 64 is plugged into the power inlet 22. The battery pack 60 preferably includes four 12V sealed lead-acid batteries (not shown) that provide 48 volts DC power to the fog generator 10. The number and voltage of the batteries can vary depending on the application. The batteries are, for example, part number BP2.3-12V batteries from Northwest Battery Supply. The battery pack 60 also includes a charging/discharging circuit (not shown) that controls the charging, discharging, charge level indication, and fusing of the batteries in the battery pack 60. The charging/discharging circuit is, for example, circuit part number 845-4800 fuse holder panel mount manufactured by Little Fuse, Inc. available through Allied Electronics, Inc. The battery pack 60 allows the user 74 to transport the unit without requiring long extension cords or power outlets.

The battery pack 60 includes a wide strap 66 that allows the battery pack 60 to be carried by a user 74 over his or her shoulder. The battery pack 60 is made of injection-molded plastic or the like. The battery pack 60 includes a holster loop 76. The fog generator 10 includes a clip 78 that mounts on the holster loop 76 allowing the fog generator 10 to clip on the battery pack 60 for hands free transportation from one location to another. The holster loop 76 is shown in FIGS. 8A–C. The clip 78 is shown in FIGS. 9A–B. When fully charged, the batter pack 60 will give up to 1.5 hours of continuous power to the fog generator 10. The combined weight of the fog generator 10 and the battery pack 60 is around 20 pounds.

The fog generator 10 includes a common battery charger (not shown) for charging and discharging the battery pack 60. The battery charger is a common off the shelf unit that recharges the battery pack 60 in about 4 hours using a common AC power source. The battery charger is connected to the battery pack 60 through the same outlet as is used to connect to the fog generator 10 to the battery pack 60. The battery charger is connected to the AC power source using a 25-foot removable cord (not shown) that can be used in place of the battery pack 60 to power the fog generator 10. The battery charger includes a printed circuit assembly that automatically changes from a charge mode (for charging the battery pack 60) to a power mode (for directly powering the fog generator 10). An example of the battery charger is model number PSC-241000A (24V/1A) manufactured by Power Sonics, Corporation headquartered in San Diego, Calif.

Although the fog generator of the present invention has been described with respect to its use in clean rooms, a person skilled in the art would recognize other applications of the fog generator herein described where a visual vapor or fog is desired.

Having illustrated and described the principles of my invention in a preferred embodiment thereof, it should be readily apparent to those skilled in the art that the invention can be modified in arrangement and detail without departing from such principles. I claim all modifications coming within the spirit and scope of the accompanying claims.

I claim:

1. A hand-held ultrasonic fog generator, comprising:
   a housing sized to be carried by a user;
   a receptacle substantially enclosed by the housing for containing water;
   at least one transducer in communication with the receptacle for vibrating the water thereby producing a fog;
   a barrel in communication with the housing and the receptacle for providing an exit to the fog; and
   a lid positioned between the housing and the barrel, the lid including a labyrinth seal that prevents the water from leaking out through the barrel.

2. The hand-held ultrasonic fog generator of claim 1 wherein the housing includes a handle having an on/off switch actuable by the user.

3. The hand-held ultrasonic fog generator of claim 2 wherein the housing includes:
   a lower cavity having a first vent for drawing air through a fan and pressurizing the housing;
   an upper cavity having a second vent for providing an exit for the air being drawn through the first vent; and
   a stiffener member separating the lower cavity from the upper cavity, the stiffener member including a third vent for channeling the air between the first and second vents.

4. The hand-held ultrasonic fog generator of claim 2 including:
   at least one driver circuit board coupled to the at least one transducer for providing control signals necessary to operate the at least one transducer;
   at least one heatsink for drawing heat away from the at least one driver circuit board; and
   a level sensor coupled to the receptacle for sensing a level of the water in the receptacle.

5. The hand-held ultrasonic fog generator of claim 4 wherein the level sensor is electrically coupled to the on/off switch such that the fog generator is turned off when the water reaches a predetermined level in the receptacle.

6. The hand-held ultrasonic fog generator of claim 1 including:
   a battery pack sized to be carried by the user; and
   a removable power cord coupling the battery pack to the housing.

7. The hand-held ultrasonic fog generator of claim 6 wherein the battery pack includes:

a battery; and a circuit for charging and discharging the battery.

8. The hand-held ultrasonic fog generator of claim 1 wherein the barrel includes a condensate trap for preventing condensed vapor from dripping out through the barrel.

9. A fog generator, comprising:

a hand-held first housing;

a container positioned within the first housing for containing water;

a transducer in communication with the container for atomizing the water and producing a fog; and a battery pack sized to be carried by a user and contained within a second housing.

10. The fog generator of claim 9 wherein the first housing includes:

a fan for drawing air into the first housing; and a fan switch for turning the fan on and off.

11. The fog generator of claim 9 including:

a transducer driver circuit coupled to the battery pack for generating control signals to operate the transducer; and a heatsink coupled to the transducer driver circuit for dissipating heat from the transducer driver circuit.

12. The fog generator of claim 9 wherein the first housing includes a handle having an on/off switch.

13. The fog generator of claim 12 including a sensor mounted on the container for sensing a level of the water in the container, the sensor being electrically coupled to the on/off switch such that the fog generator is turned off when the water reaches a predetermined level in the container.

14. The fog generator of claim 9 wherein the battery pack includes:

a battery;

a circuit for charging and discharging the battery; and a removable power cord for electrically coupling the battery to the transducer.

15. The fog generator of claim 9 including:

a barrel in communication with the first housing and the container for providing an exit to the fog; and a lid positioned between the container and the barrel having a labyrinth seal that prevents the water from leaking out through the barrel.

16. The fog generator of claim 15 wherein the barrel includes a condensate trap for preventing condensed vapor from dripping out through the barrel.

17. A fog generator, comprising:

a hand-held housing;

a container positioned within the housing for containing water;

a transducer in communication with the container for atomizing the water and producing a fog;

a battery pack sized to be carried by a user;

a barrel in communication with the housing and the container for providing an exit to the fog; and a lid positioned between the container and the barrel having a labyrinth seal that prevents the water from leaking out through the barrel.

18. The fog generator of claim 17 wherein the barrel includes a condensate trap for preventing condensed vapor from dripping out through the barrel.

19. An ultrasonic fog generator, comprising:

a housing sized to be carried by a user;

a fog generating means contained within the housing for generating a fog; and a self contained battery pack sized to be carried by a user and coupled to the housing and the fog generating means through a removable cable.

20. The ultrasonic fog generator of claim 19 wherein the fog generating means includes:

a containing means for containing water;

transducer means for atomizing the water thereby producing the fog; and a sensing means coupled to the container for sensing a level of the water.

21. The ultrasonic fog generator of claim 19 wherein the battery pack includes:

a battery means; and a charging/discharging means for charging and discharging the battery means.

* * * * *